(12) United States Patent
Mihara

(10) Patent No.: US 8,478,839 B2
(45) Date of Patent: Jul. 2, 2013

(54) INFORMATION PROCESSING APPARATUS, INFORMATION PROCESSING SYSTEM, METHOD FOR CONTROLLING INFORMATION PROCESSING APPARATUS, AND PROGRAM

(75) Inventor: Makoto Mihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 12/997,453

(22) PCT Filed: Nov. 1, 2010

(86) PCT No.: PCT/JP2010/069770
§ 371 (c)(1),
(2), (4) Date: Dec. 10, 2010

(87) PCT Pub. No.: WO2011/077842
PCT Pub. Date: Jun. 30, 2011

(65) Prior Publication Data
US 2011/0246602 A1 Oct. 6, 2011

(30) Foreign Application Priority Data

Dec. 22, 2009 (JP) ................................. 2009-291405

(51) Int. Cl.
*G06F 15/16* (2006.01)
*G06F 15/173* (2006.01)
(52) U.S. Cl.
USPC ........... 709/217; 709/203; 709/218; 709/223; 709/224

(58) Field of Classification Search
USPC . 709/203, 224, 226, 217, 218, 223; 358/1.15; 705/50
See application file for complete search history.

(56) References Cited

U.S. PATENT DOCUMENTS

| 2006/0077423 | A1 | 4/2006 | Mathieson et al. | 358/1.15 |
| 2007/0103724 | A1* | 5/2007 | Jeyachandran et al. | 358/1.15 |
| 2009/0125444 | A1* | 5/2009 | Cochran et al. | 705/50 |
| 2009/0125719 | A1* | 5/2009 | Cochran et al. | 709/203 |
| 2009/0237728 | A1* | 9/2009 | Yamamoto | 358/1.15 |
| 2009/0276759 | A1* | 11/2009 | Aoyama et al. | 717/124 |
| 2009/0287768 | A1* | 11/2009 | Tanaka | 709/226 |
| 2010/0198964 | A1* | 8/2010 | Tanaka | 709/224 |

FOREIGN PATENT DOCUMENTS

| JP | 2006-127503 | 5/2006 |
| JP | 2006-235845 | 9/2006 |
| JP | 2009-080587 | 4/2009 |
| JP | 2009-230253 | 10/2009 |

\* cited by examiner

*Primary Examiner* — Quang N Nguyen
(74) *Attorney, Agent, or Firm* — Fitzpatrick, Cella, Harper & Scinto

(57) ABSTRACT

An information processing apparatus according to the present invention transmits first processing request data in accordance with the content of a user instruction through an operation screen displayed on a Web browser to a Web server, receives a request based on the first processing request data from the Web server, and executes processing in accordance with the received response data. Moreover, before completion of the execution of the processing, the information processing apparatus transmits second processing request data to the Web server at the timing specified by the Web server, and displays an operation screen indicating the state of the processing according to response data received from the Web server.

17 Claims, 12 Drawing Sheets

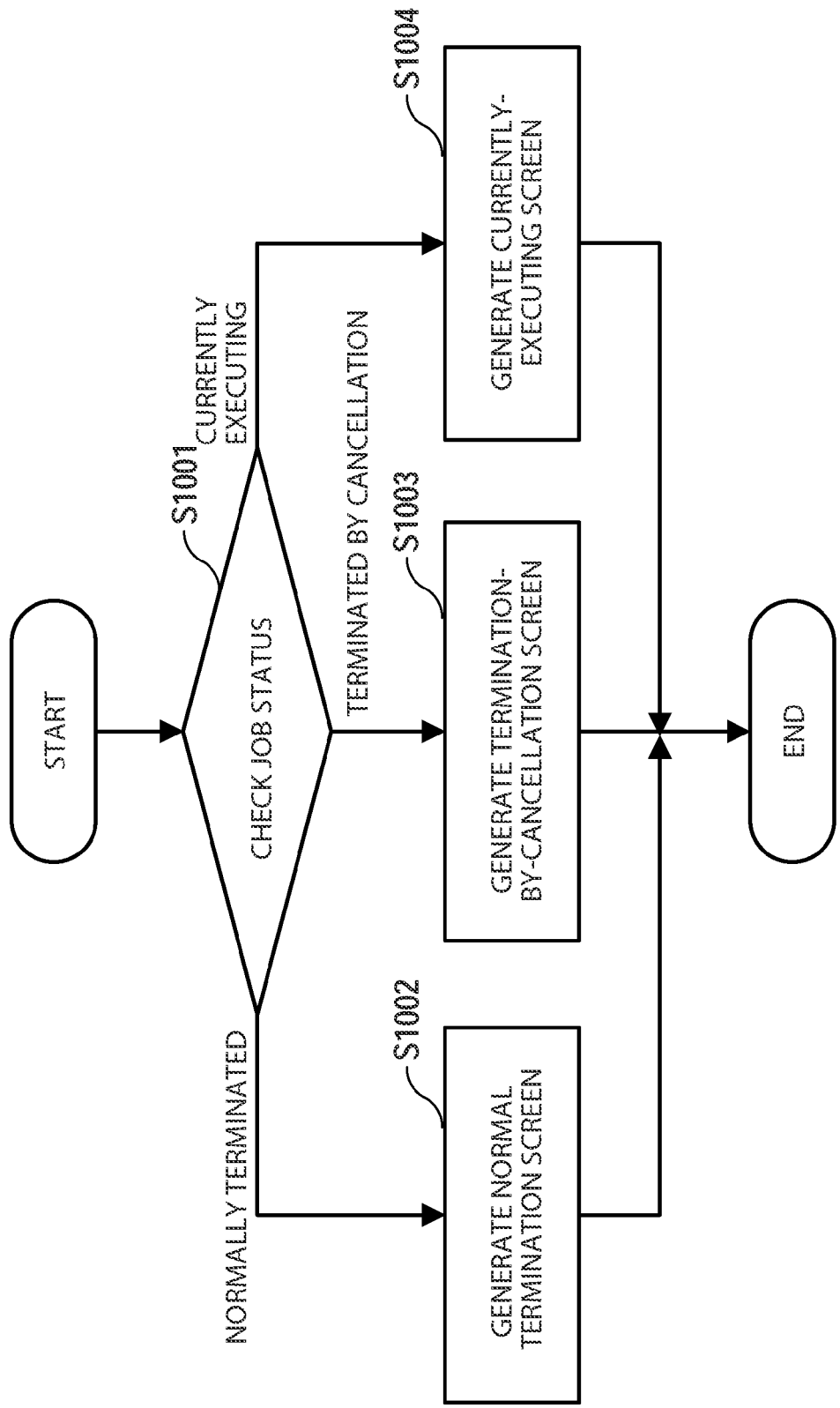

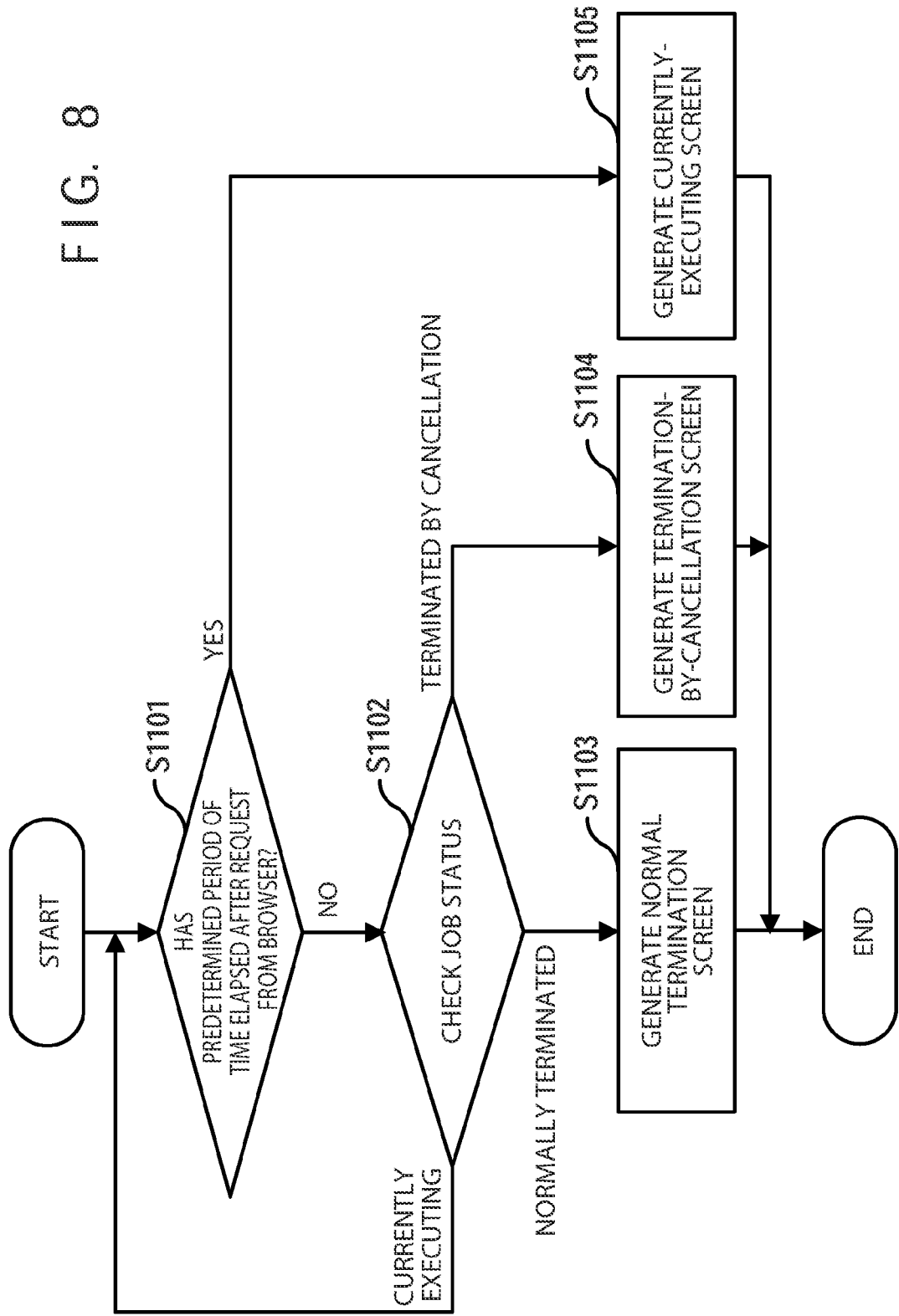

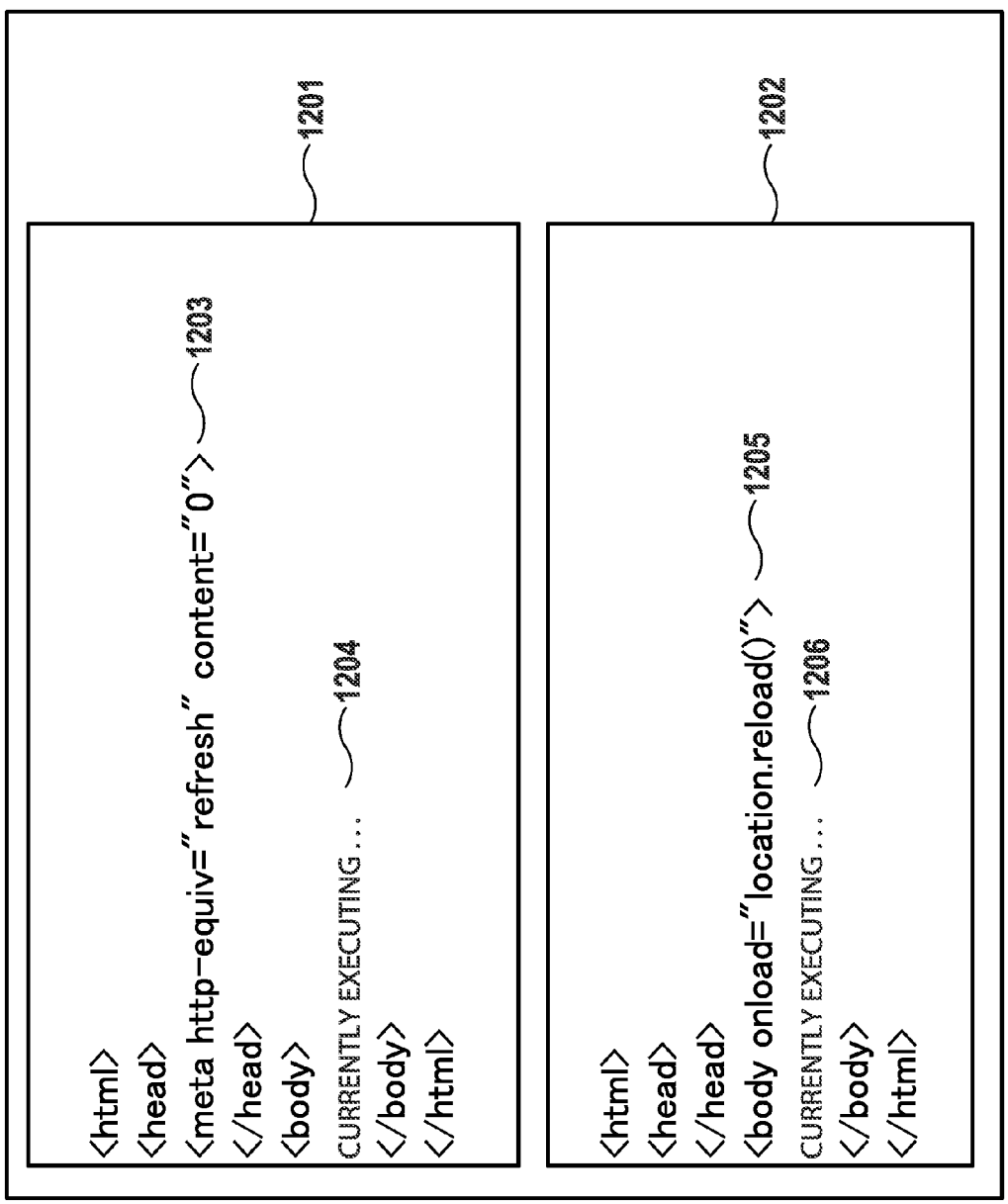

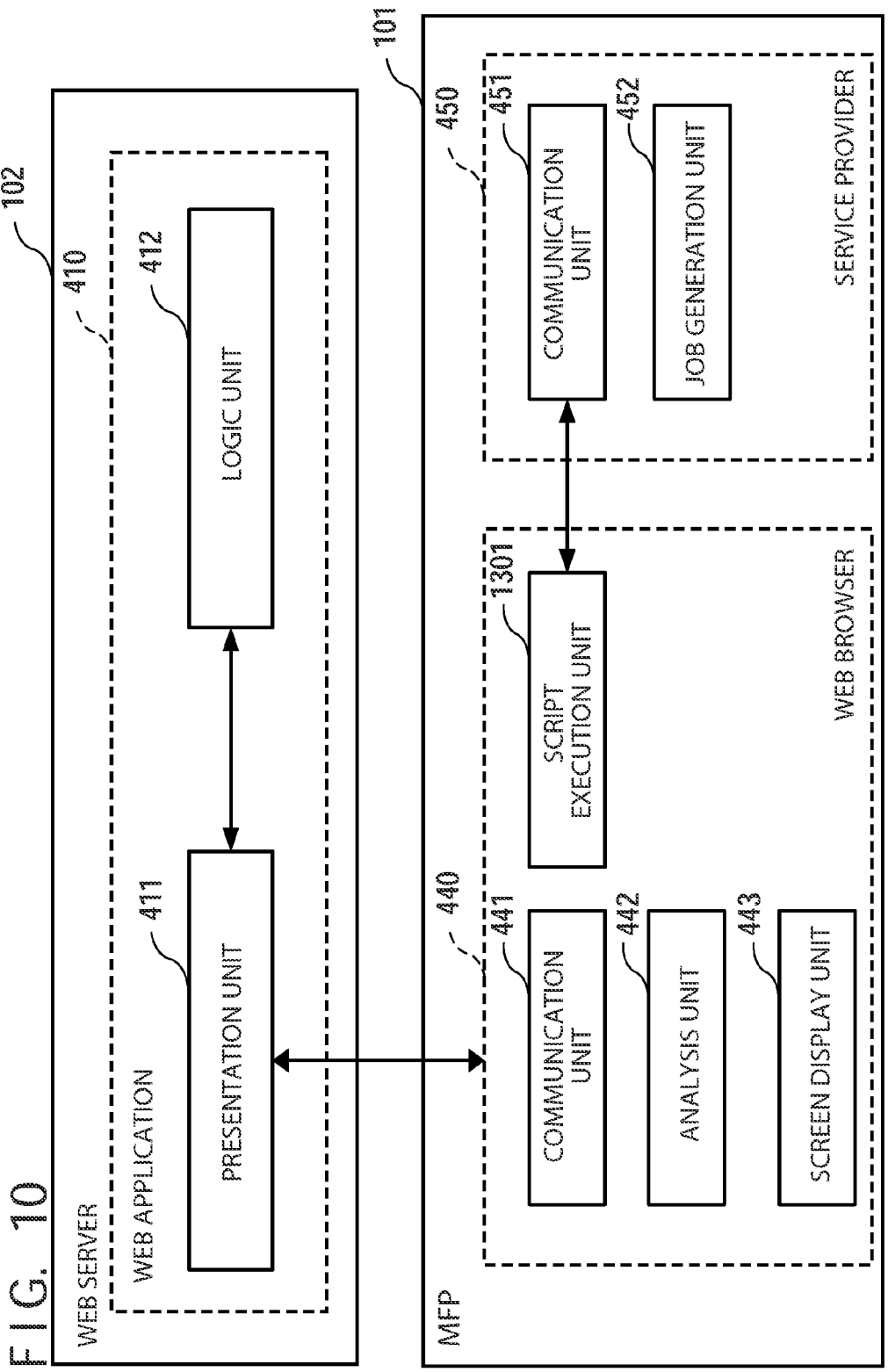

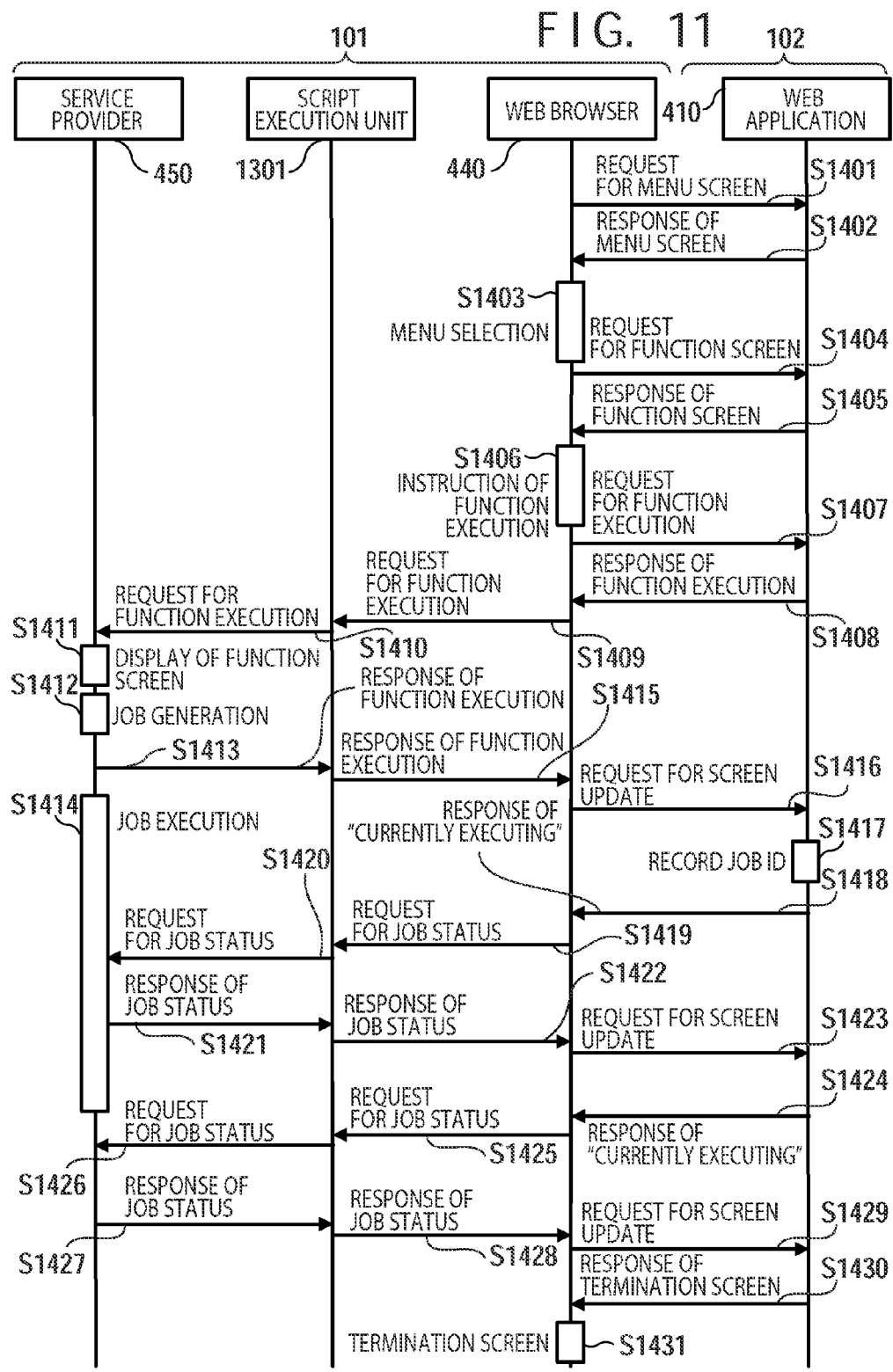

FIG. 12

```
<?xml version="1.0" encoding="UTF-8"?>
<JobScript xmlns="http://www.xxx.co.jp/jobScript">
 <Body>
  <ScanToFtp response="0">
   <Location>
    <GetURL>http://www.xxx.com/porcessing.htm</GetURL>
    <Parameter>JobId</Parameter>
   </Location>
   <Settings>
    <FTPAddress>
     <HostName>ftpserver.xxx.com</HostName>
     <Path>folder</Path>
    </FTPAddress>
    <FileFormat>PDF</FileFormat>
    <FileName>test.pdf</FileName>
   </Settings>
  </ScanToFtp>
 </Body>
</JobScript>
```
~1501

```
<?xml version="1.0" encoding="UTF-8"?>
<JobScript xmlns="http://www.xxx.co.jp/jobScript">
 <Body>
  <GetJobStatus response="20">
   <Location>
    <GetURL>http://www.xxx.com/porcessing.htm</GetURL>
    <Parameter>JobStatus</Parameter>
   </Location>
   <Settings>
    <JobId>0123456789</JobId>
   </Settings>
  </GetJobStatus>
 </Body>
</JobScript>
```
~1601

INFORMATION PROCESSING APPARATUS, INFORMATION PROCESSING SYSTEM, METHOD FOR CONTROLLING INFORMATION PROCESSING APPARATUS, AND PROGRAM

TECHNICAL FIELD

The present invention relates to an information processing apparatus having a Web browser for displaying an operation screen that is provided from a Web server, an information processing system including the information processing apparatus, a method for controlling the information processing apparatus, and a program.

BACKGROUND ART

Technology whereby an information processing apparatus such as a personal computer is connected to a Web server via a network, and an operation screen that is provided from the Web server is displayed on a Web browser of the information processing apparatus is known. In this case, the Web browser of the information processing apparatus requests an operation screen from the Web server. Then, in response to the request from the Web browser, a Web application stored in the Web server returns HTML data for allowing the Web browser to display an operation screen to the Web browser as a response. The Web browser analyzes the received HTML data and displays an operation screen based on the description in the HTML data. Furthermore, when a user inputs an instruction through the operation screen displayed on the Web browser, the Web browser notifies the Web server of the input instruction. Then, the Web application of the Web server that has received the notification executes processing according to the input instruction.

Moreover, these days, some MFPs (Multi Function Peripherals) that are equipped with a scanner, a printer, and the like have a Web browser as described above, and such an MFP displays an operation screen that is provided from a Web server on the Web browser of the MFP and accepts various types of instructions from the user through the above-described procedure (for example, Japanese Patent Laid-Open No. 2006-127503 (Patent Document 1)). The instructions input by the user are notified to the Web server by the Web browser of the MFP. The Web server that has received the notification requests the MFP to execute various types of processing according to the content of the instructions input by the user. Then, the MFP that has received this request executes the requested processing. Thus, it is no longer necessary to hold all of the menu data for operating the MFP in the MFP, and a change to the menu data can be easily made on the Web server.

Generally, when the Web application of the Web server executes processing based on an instruction input through an operation screen displayed on the Web browser of the MFP, a new operation screen is displayed on the Web browser in response to completion of the processing by the Web application. That is to say, upon completion of the processing by the Web application, the Web server generates HTML data for a notification screen that notifies the user of the completion of the processing or an operation screen that allows the user to perform the next operation. Then, the generated HTML data is transmitted to the Web browser as a response to the request from the Web browser. On the other hand, in some Web browsers that are installed in information processing apparatuses such as PCs and MFPs, a time limit (a timeout period) within which a response from a Web server is to be received after a request is transmitted to the Web server is set. If there is no response from the Web server within the timeout period, the Web browser performs a process for nullifying the transmitted request (a timeout process). As a result of the timeout process, the Web browser stops waiting for a response to the transmitted request and is ready to transmit a new request, for example. At this time, in some cases, a process for abandoning the actual session is performed to release the resources of the Web browser.

In the above-described Patent Document 1, when the user inputs an instruction through an operation screen displayed on the Web browser of the MFP, the Web browser transmits a request based on that instruction to the Web server, and the Web server transmits a processing result (a new processing request), which is a response to the request, to the Web browser in the form of HTML data.

However, if a predetermined period of time has elapsed without any instruction being input by the user after the display of the operation screen on the Web browser, the timeout process is automatically executed, so that the response transmitted from the Web server cannot be normally received by the Web browser of the MFP. Thus, the user cannot be notified of the result of the processing executed by the MFP.

SUMMARY OF INVENTION

The present invention has been made in view of the above-described problems, and provides an information processing apparatus that is capable of avoiding a timeout of a Web browser, an information processing system, a method for controlling the information processing apparatus, and a program.

According to one aspect of the present invention, there is provided an information processing apparatus having a Web browser for displaying an operation screen that is provided from a Web server, comprises: first transmission means for transmitting first processing request data in accordance with the content of a user instruction through an operation screen displayed on the Web browser to the Web server; execution means for receiving a request based on the first processing request data transmitted by the first transmission means from the Web server, and executes processing in accordance with the received request; and second transmission means for transmitting second processing request data to the Web server at a timing specified by the Web server, before the processing by the execution means is completed, wherein the Web browser receives response data with respect to the second processing request data transmitted by the second transmission means from the Web server, and displays an operation screen indicating a state of the processing by the execution means according to the received response data.

According to another aspect of the present invention, there is provided an information processing system comprising a Web server and an information processing apparatus having a Web browser for displaying an operation screen that is provided from the Web server, the information processing apparatus comprises: first transmission means for transmitting first processing request data in accordance with the content of a user instruction through an operation screen displayed on the Web browser to the Web server; execution means for receiving a request based on the first processing request data transmitted by the first transmission means from the Web server, and executes processing in accordance with the received request; and second transmission means that transmits second processing request data to the Web server at a timing specified by the Web server, before the processing by the execution means is completed, wherein the Web browser receives response data with respect to the second processing request data transmitted by the second transmission means from the Web server, and displays an operation screen indicating a state of the processing by the execution means according to the received response data.

According to still another aspect of the present invention, there is provided a method for controlling an information processing apparatus having a Web browser for displaying an operation screen that is provided from a Web server, comprises the steps of: first transmission means of the information processing apparatus transmitting first processing request data in accordance with the content of a user instruction through an operation screen displayed on the Web browser to the Web server; execution means of the information processing apparatus receiving a request based on the first processing request data transmitted by the first transmission means from the Web server, and executing processing in accordance with the received request; and second transmission means of the information processing apparatus transmitting second processing request data to the Web server at a timing specified by the Web server, before the processing by the execution means is completed, wherein the Web browser receives response data with respect to the second processing request data transmitted by the second transmission means from the Web server, and displays an operation screen indicating a state of the processing by the execution means according to the received response data.

According to the present invention, it is possible to provide an information processing apparatus that is capable of avoiding a timeout of a Web browser, an information processing system, a method for controlling the information processing apparatus, and a program.

Further features of the present invention will become apparent from the following description of exemplary embodiments with reference to the attached drawings.

BRIEF DESCRIPTION OF DRAWINGS

FIG. 7 illustrates a processing procedure of a Web application 410.

FIG. 8 illustrates a processing procedure of the Web application 410 according to a second embodiment.

FIG. 9 is a diagram showing examples of HTML data.

FIG. 10 is a diagram showing a software configuration of the MFP 101 and the Web server 102 according to a fourth embodiment.

FIG. 11 illustrates a processing procedure of an information processing system.

FIG. 12 is a diagram showing examples of function execution scripts.

DESCRIPTION OF EMBODIMENTS

Hereinafter, embodiments of the present invention will be described in detail with reference to the drawings. The embodiments below are not to be construed as limiting the claims, and not all the combinations of features described in the embodiments are necessary for means of solving the problems of the present invention.

First Embodiment

An information processing apparatus according to the present embodiment is, for example, an MFP having the functions of a scanner, a printer, and the like and is equipped with a Web browser for displaying an operation screen that is provided from a Web server. In the present embodiment, an example in which the Web browser regularly accesses the Web server, thereby preventing the Web browser from timing out will be described.

Figure 1:
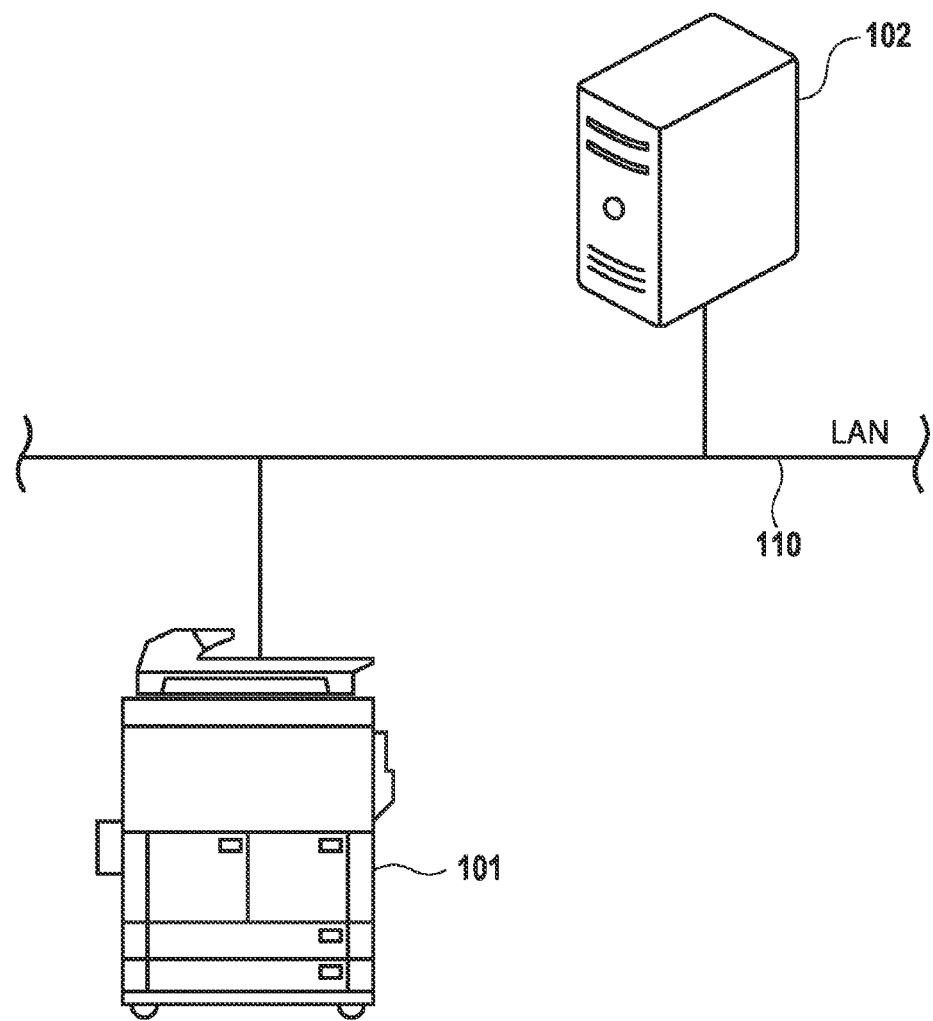
FIG. 1 is a diagram showing an overall configuration of an information processing system according to a first embodiment of the present invention.
Figure 2:
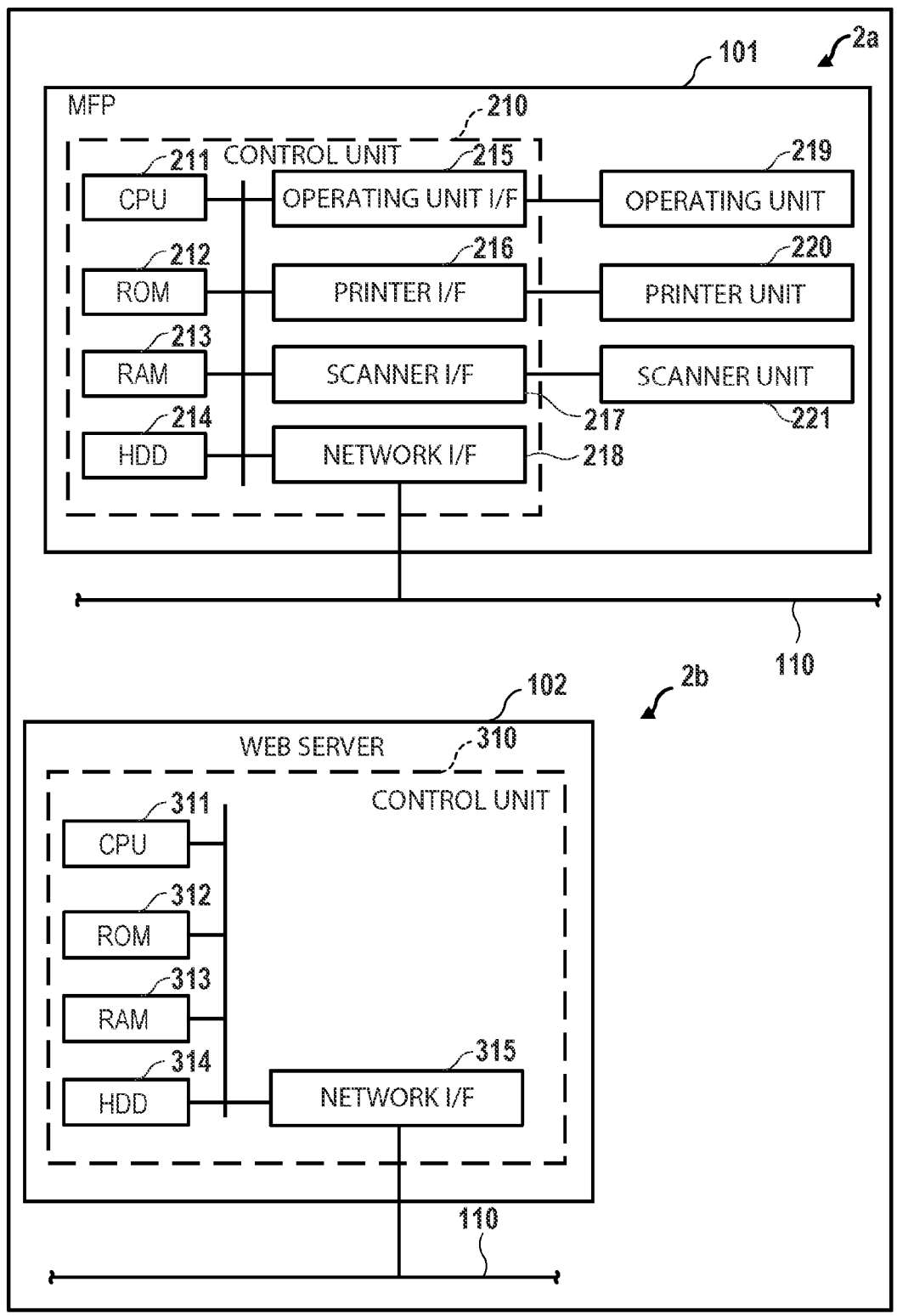
FIG. 2 is a diagram showing a hardware configuration of an MFP 101 and a Web server 102.

Hardware Configuration of Information Processing System (FIGS. 1 and 2)

An information processing system according to the present embodiment includes an MFP 101 and a Web server 102 connected to the MFP 101 via a network such as a LAN 110. The MFP 101 and the Web server 102 are configured so as to be communicable with each other.

Hardware Configuration of the MFP 101 (2a of FIG. 2)

The MFP 101 includes a scanner unit 221 for inputting an original image, a printer unit 220 for outputting an image, an operating unit 219 for enabling a user to perform a desired operation, and a control unit 210 that performs overall control of the MFP 101. The control unit 210 includes a CPU 211, a ROM 212, a RAM 213, an HDD 214, and various types of interfaces.

The CPU 211 reads out a control program stored in the ROM 212 and performs various types of control such as read control and transmission control. The RAM 213 is used as a temporary storage area such as a main memory or a work area of the CPU 211. The HDD 214 stores image data, various types of programs, or various types of information tables that will be described later. An operating unit I/F 215 connects the operating unit 219 and the control unit 210 to each other. The operating unit 219 includes a keyboard, a liquid crystal display unit having the function of a touch panel, and the like.

The MFP 101 further has the function of a Web browser (described later), and this Web browser analyzes HTML data received from the Web server 102 and displays an operation screen based on the description in the received HTML data on the liquid crystal display unit of the operating unit 219.

A printer I/F 216 connects the printer unit 220 and the control unit 210 to each other. Image data to be printed in the printer unit 220 is transferred from the control unit 210 via the printer I/F 216 and printed onto a recording medium in the printer unit 220. A scanner I/F 217 connects the scanner unit 221 and the control unit 210 to each other. The scanner unit 221 reads an image on an original, generates image data, and inputs the generated image data to the control unit 210 via the scanner I/F 217. A network I/F 218 connects the control unit 210 of the MFP 101 to the LAN 110. The network I/F 218 transmits image data or information to an external apparatus (e.g., the Web server 102) on the LAN 110 and receives various types of information from an external apparatus on the LAN 110.

Hardware Configuration of the Web Server 102 (2b of FIG. 2)

The Web server 102 includes a control unit 310 that controls the overall operation of the Web server 102. The control unit 310 includes a CPU 311, a ROM 312, a RAM 313, an HDD 314, and a network I/F 315.

The CPU 311 reads out a control program stored in the ROM 312 and executes various types of control processing. The RAM 313 is used as a temporary storage area such as a main memory or a work area of the CPU 311. The HDD 314 stores image data, various types of programs, or various types of information tables that will be described later. The network I/F 315 connects the control unit 310 (the Web server 102) to the LAN 110. The network I/F 315 exchanges various types of information with other apparatuses on the LAN 110.

Figure 3:
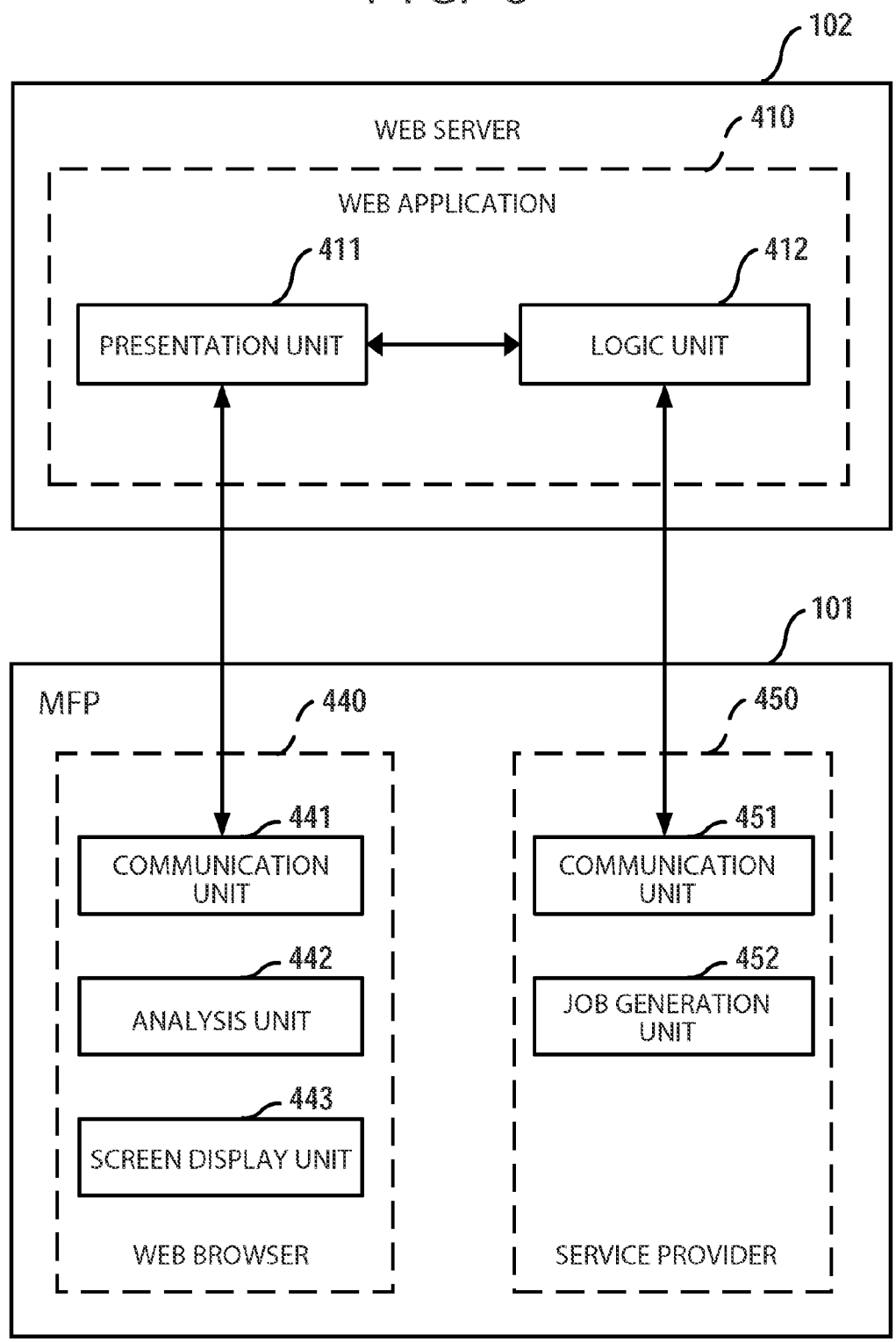
FIG. 3 is a diagram showing a software configuration of the MFP 101 and the Web server 102.

Software Configuration of Information Processing System (FIG. 3)

Software Configuration of the MFP 101 The MFP 101 includes a Web browser 440 and a service provider 450. The CPU 211 of the MFP 101 executing a control program realizes each functional unit.

The Web browser 440 has a communication unit 441, an analysis unit 442, and a screen display unit 443. The communication unit 441 communicates with a presentation unit 411 of a Web application 410 in accordance with the HTTP protocol. More specifically, the communication unit 441 requests an operation screen to be displayed on the Web browser 440 from the Web application 410. Furthermore, the communication unit 441 transmits information for enabling the user to provide input through the operation screen displayed on the Web browser 440 as a request to the Web application 410. Moreover, the communication unit 441 receives a response (a processing result) transmitted from the Web application 410.

The analysis unit 442 analyzes the response that the communication unit 441 has received from the Web application 410. The HTML data includes HTML data and description that indicates the content of the operation screen to be displayed on the Web browser 440. The screen display unit 443 displays the operation screen on the operating unit 219 based on the result of analysis of the HTML data.

The service provider 450 has a communication unit 451 and a job generation unit 452. The communication unit 451 accepts a processing request from a logic unit 412 of the Web application 410 (described later). The job generation unit 452 receives the processing request that the communication unit 451 has accepted, and generates and executes a job for executing the requested processing.

Software Configuration of the Web Server 102

The Web server 102 has the Web application 410. The CPU 311 of the Web server 102 executing a control program realizes the Web application 410.

The Web application 410 receives information that is transmitted from the Web browser 440 as a request, and executes processing based on the received information. The processing result is transmitted from the Web application 410 to the Web browser 440 as a response.

The Web application 410 has the presentation unit 411 and the logic unit 412. The presentation unit 411 communicates with the communication unit 441 of the MFP 101 and receives a request that is transmitted from the communication unit 441. Next, the presentation unit 411 notifies the logic unit 412 of the received request and waits for a response from the logic unit 412. The presentation unit 411 that has received response data from the logic unit 412 transmits, as a response, HTML data corresponding to an operation screen to be displayed on the Web browser 440 of the MFP 101 according to the content of the response data. Information that is input through the operation screen displayed on the Web browser 440 of the MFP 101 is transmitted from the communication unit 441 as a request.

The logic unit 412 executes various types of processing in response to the request notified from the presentation unit 411 and requests the MFP 101 to execute processing. Specifically, the logic unit 412 requests execution of print processing by the printer unit 220 of the MFP 101, execution of read processing by the scanner unit 221, or execution of transmission processing via the network I/F 218.

When requesting the MFP 101 to execute specific processing, the logic unit 412 communicates with the communication unit 451 of the service provider 450 of the MFP 101. Then, the logic unit 412 receives the result of the processing executed by the MFP 101 from the communication unit 451 of the MFP 101.

Figure 4:
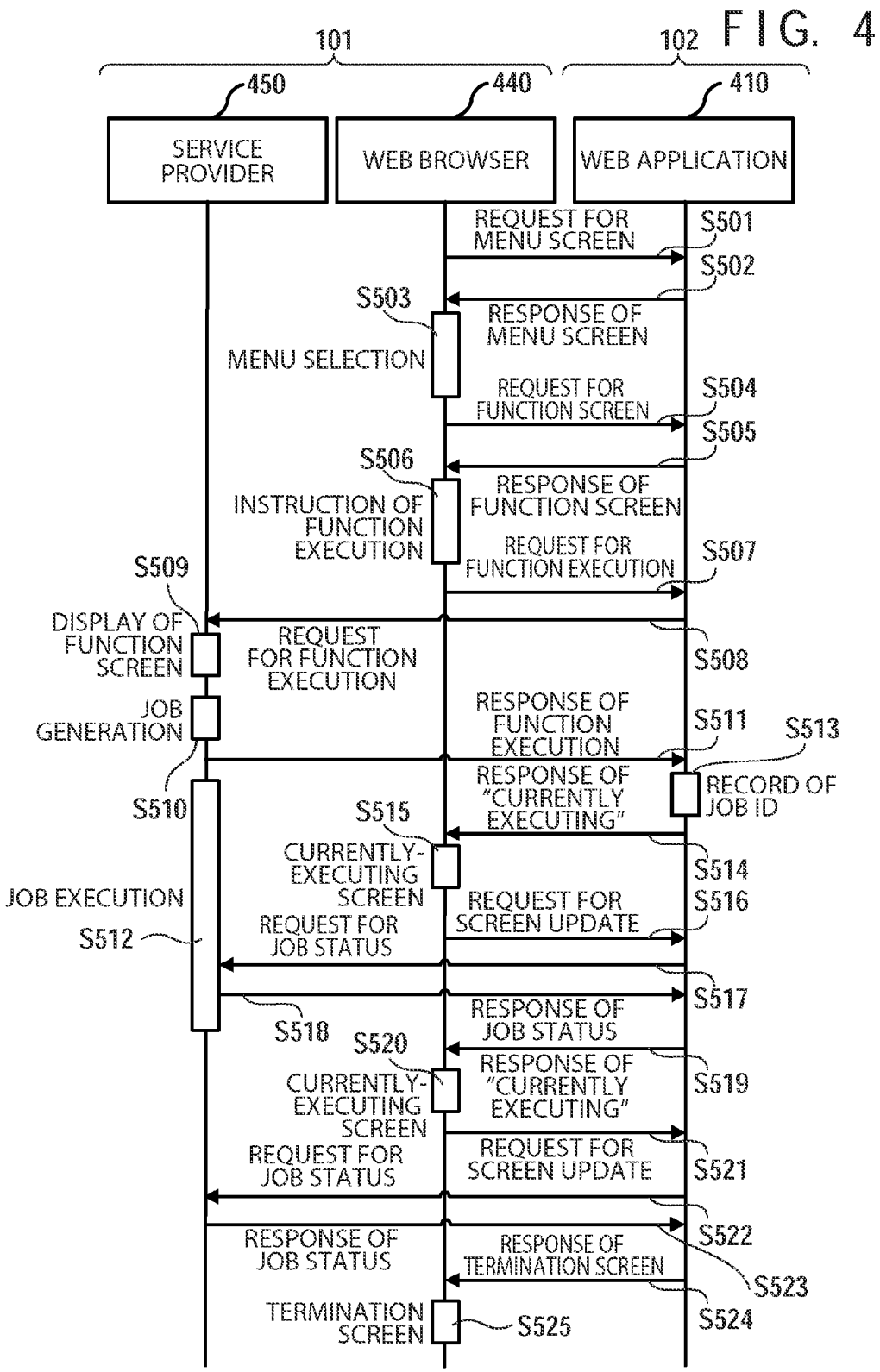
FIG. 4 illustrates a processing procedure of the information processing system.

Processing Procedure of Information Processing System (FIG. 4)

First, the Web browser 440 of the MFP 101 is activated by a user operation. The Web browser 440 requests a menu screen from the Web application 410 (step S501). The Web application 410 that has received the request returns the menu screen to the Web browser 440 as a response (step S502).

Figure 5:
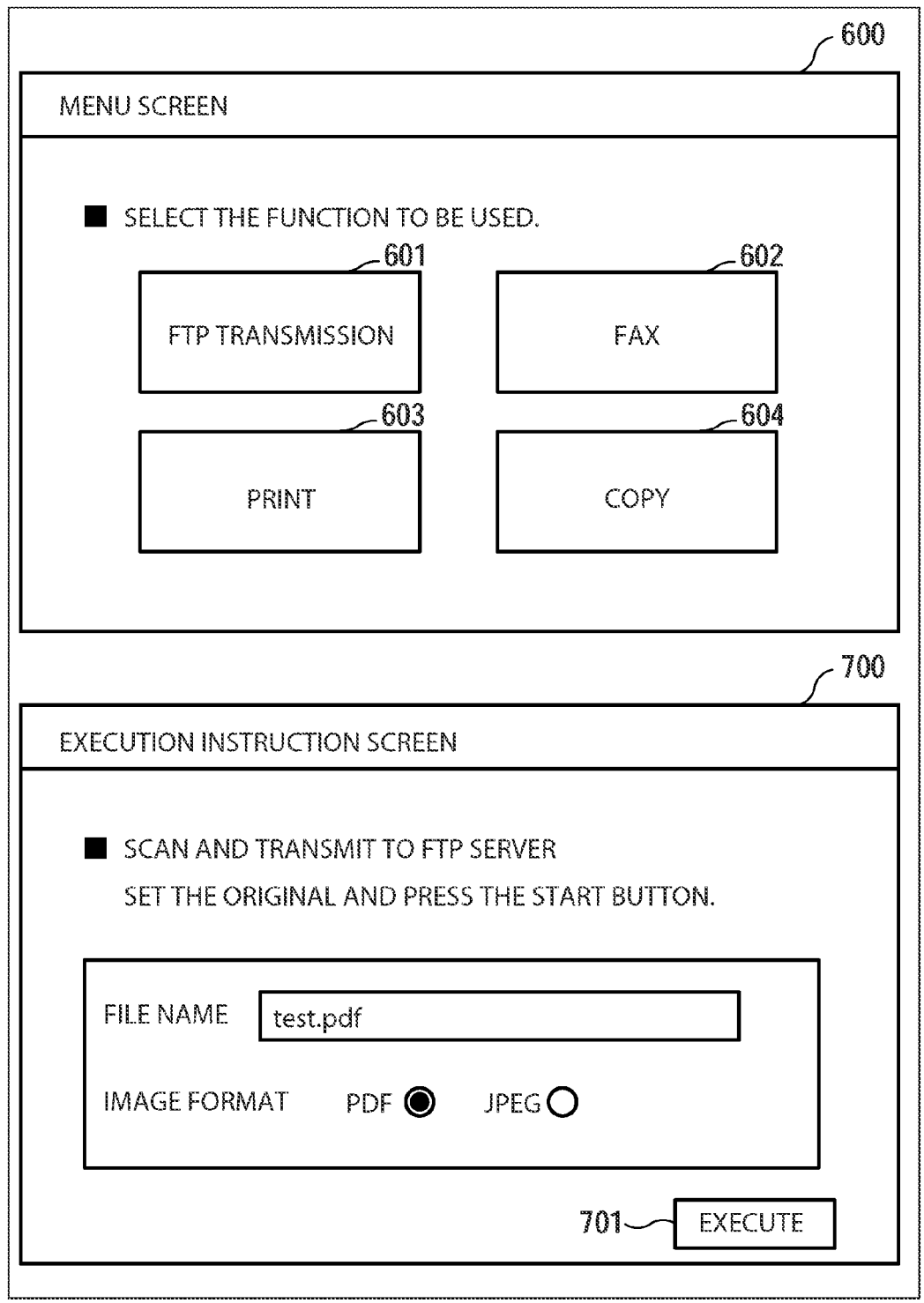
FIG. 5 is a diagram showing examples of a menu screen and a function execution instruction screen.

The Web browser 440 displays the received menu screen (for example, a screen 600 in FIG. 5) (step S503). In FIG. 5, reference numerals 601 to 604 denote buttons for enabling the user to select which function of the MFP 101 the user wishes to use. Once the user has selected a function to use, the Web browser 440 makes a request to the Web application 410 for a function screen corresponding to the button pressed by the user (step S504). The Web application 410 that has received the request returns the function screen to the Web browser 440 as a response (step S505).

Next, the Web browser 440 displays the received function execution instruction screen (for example, a screen 700 in FIG. 5) (step S506). The function execution instruction screen 700 shown in FIG. 5 is a screen for instructing transmission of image data generated from an image on an original read by using the scanner unit 221 of the MFP 101 to an FTP server on the LAN 110. In this example, it is set that the image data is to be generated in PDF format and given a file name "test.pdf". Reference numeral 701 denotes an Execute button for instructing the execution of the function.

Once the user has instructed the execution of the function by pressing the Execute button 701, the Web browser 440 (a first transmission unit) requests the Web application 410 to execute the function (i.e., transmits first processing request data) (step S507). The Web application 410 that has received the request requests the service provider 450 to execute the function (step S508). In step S508, an instruction is given to the service provider 450 using, for example, parameters indicated by reference numeral 801 in FIG. 6. As the parameters, values instructed by user input through the function execution instruction screen displayed on the Web browser 440 in step S506 are set, that is, "FTP transmission" is set as the function to be executed, "test.pdf" is set as the name of the file to be transmitted, and "PDF" is set as the file type. Moreover, the address of the FTP server and the path of the folder are set as the destination. Finally, with respect to the response mode, the timing at which the service provider 450 will respond to the request from the Web application 410 is set. In this example, "immediate" is set, so that the service provider 450 will immediately return a response without waiting for full completion of the execution of the function. The service provider 450 that has been instructed to execute the function using these parameters displays a function screen (step S509).

Furthermore, the service provider 450 generates a job in accordance with the parameters 801 and issues an ID (identification data) by which the job is uniquely identified (step S510). Then, the service provider 450 returns the issued job ID to the Web application 410 as a response (step S511). It should be noted that as instructed in step S508, this response is immediately made without waiting for completion of the execution of the job.

Even after returning the response to the Web application 410, the service provider 450 continues to execute processing of the job generated in step S510 (step S512). Here, for example, the service provider 450 executes all of a series of processing steps related to the job of the user operation, such as function control of the scanner unit and the like, display and update of a currently-executing screen, an error screen, or a screen that prompts the user to perform a specific operation (e.g., placing an original), resumption after an error recovery, and giving a scan start instruction after an original is placed. Furthermore, after processing of the job has been finished, the function screen displayed in step S509 is terminated, and a browser screen is displayed again.

On the other hand, the Web application 410 records the job ID obtained in step S511 (step S513). Furthermore, the Web application 410 returns a response to the Web browser 440 (step S514).

According to the above-described processing, a series of processing steps from the receipt of the function execution request by the Web browser 440 in step S507 until the receipt of the first response in step S514 is immediately executed. Thus, the Web browser 440 can have a response without waiting for completion of the execution of a job, and therefore a timeout can be prevented. However, the foregoing processing alone does not make it possible to present a job processing result to the user by displaying the result on the Web browser 440. The processing described hereinbelow is related to a process for displaying a job processing result on the Web browser 440.

Figure 6:
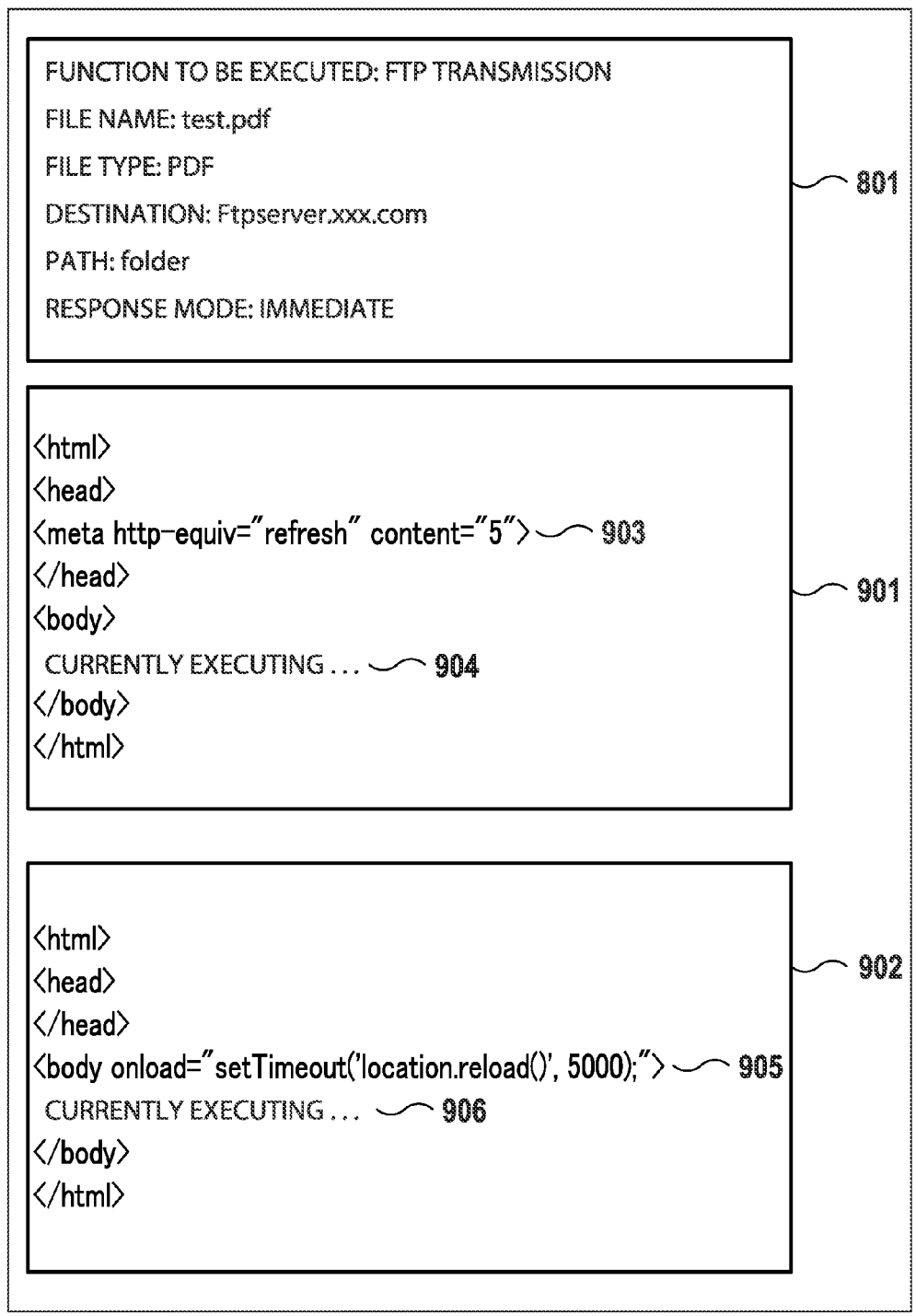
FIG. 6 is a diagram showing examples of parameters and HTML data.

Reference numerals 901 and 902 in FIG. 6 indicate examples of HTML data that the Web application 410 sends to the Web browser 440 as a response in step S514. "<meta http-equiv="refresh" content="5">" is embedded in the head tag of the HTML 901 as a meta tag 903. This is a tag that gives an instruction to reread a currently displayed page five seconds later. That is to say, this HTML data includes setting data that defines the timing of the response in step S514.

The Web browser 440 displays the HTML 901 and at the same time interprets the meta tag (step S515). The Web browser 440 (a second transmission unit) transmits a request for screen update (second processing request data) to the Web application 410 five seconds later according to the content of the instruction of the meta tag (step S516). Reference numeral 904 indicates an area in which contents to be displayed on the screen are described, and the Web application 410 can cause the Web browser 440 to display any desired screen appropriate for the processing status of the job. In this example, "Currently executing . . . " is displayed.

"onload="setTimeout('location.reload( )',5000);" is embedded in a body tag 905 of the HTML 902. This is a JavaScript that is executed when the HTML is read, and is a process for rereading the currently displayed page five seconds later. Reference numeral 906 indicates an area in which contents to be displayed on the screen are described as is the case with the area 904, and the Web application 410 can cause the Web browser 440 to display any desired screen appropriate for the processing status of the job. In this example, "Currently executing . . . " is displayed. The HTML 901 and the HTML 902 employ mutually different approaches, but realize the same processing.

The Web application 410 that has received the request for screen update in step S516 requests the service provider 450 to obtain job status using the job ID recorded in step S513 as a parameter (step S517). The service provider 450 (an obtaining unit) obtains the status of the job indicated by the given job ID. The status of a job shows a processing status such as "currently executing", "normally terminated", or "terminated by cancellation". The service provider 450 (a third transmission unit) that has obtained the status returns the obtained status to the Web application 410 as a response (step S518).

The Web application 410 that has received the job status generates HTML data of a screen to be sent back to the Web browser 440 according to the content of processing. FIG. 7 is a flowchart illustrating this process. The Web application 410 checks which of the above-described three patterns (i.e., "currently executing", "normally terminated", and "terminated by cancellation") the obtained job processing status is (step S1001). If the status is "normally terminated", a normal termination screen is generated (step S1002). If the status is "terminated by cancellation", a termination-by-cancellation screen is generated (step S1003). If the status is "currently executing", a currently-executing screen is generated (step S1004). The currently-executing screen generated in step S1004 corresponds to the HTML 901 or 902 in FIG. 6.

Processing in steps S519 to S523 is an operation after a currently-executing screen has been generated in step S1004, and is the same as the processing procedure in steps S514 to S516. If the job status is "normally terminated" or "terminated by cancellation", the Web application 410 returns termination screen HTML to the Web browser 440 as a response (step S524). Finally, the Web browser 440 displays the received termination screen (step S525) and ends the series of processing steps.

As described in steps S517 to S525, while the MFP 101 is processing a job, the Web browser 440 can obtain the latest status of the job by regularly requesting screen update from the Web application 410. Thus, the termination screen can be presented to the user at a stage when the job status has changed to "terminated".

As described above, according to the present embodiment, while the Web browser is performing an operation of the MFP, the occurrence of a timeout can be avoided, and the discontinuance of a user operation due to a timeout can be avoided.

Second Embodiment

The present embodiment is different from the first embodiment in part of the operation of the Web application 410. In the first embodiment, the Web browser 440 requests screen update from the Web application 410 after a predetermined period of time has elapsed according to the content of an instruction from the Web application 410. Therefore, there is a slight time lag between when job processing is completed and when the result that the processing has been completed is displayed on the Web browser 440. Moreover, in the first embodiment, although increasing the frequency of requests from the Web browser 440 can reduce the time lag, this method leads to an increase in the communication load or an increase in the processing load of the Web application 410 and the service provider 450.

In contrast, in the present embodiment, the Web browser 440 immediately makes a request to the Web application 410. The Web application 410 that has received the request defers a response to that request within a time range during which a timeout of the Web browser 440 does not occur. The Web application 410 regularly inquires about the processing status from the service provider 450 while deferring the response to the Web browser 440. The Web application 410 returns a response to the Web browser 440 only if the job processing status has changed to "terminated" or a deferring time has expired. With the above-described processing, it is possible not only to prevent the occurrence of a timeout, but also to immediately display a screen of the result that the job has been completed on the Web browser 440.

FIG. 8 is a flowchart illustrating processing that is performed by the Web application 410 when the Web browser 440 has transmitted a request for screen update similar to that in step S516 to the. Web application 410. First, the Web application 410 determines whether or not a predetermined period of time has elapsed after the request from Web browser 440 (step S1101). The predetermined period of time is a time period during which a timeout of the Web browser 440 does not occur. That is to say, this time period is shorter than a timeout period and is determined within such a range that response data from the Web server can be received during the timeout period. For example, when the timeout period of the Web browser 440 is five minutes, this time period is set to a time period shorter than five minutes, that is, the timeout period. If the predetermined period of time has not elapsed yet, the Web application 410 obtains the job status from the service provider 450 and checks which of the above-described three patterns (i.e., "currently executing", "normally terminated", and "terminated by cancellation") the obtained job processing status is (step S1102). If the job status is "currently executing", the procedure is returned to processing in step S1101. IF the status is "normally terminated", a normal termination screen is generated (step S1103). If the status is "terminated by cancellation", a termination-by-cancellation screen is generated (step S1104). If it is determined in step S1101 that the predetermined period of time has elapsed after the request from the Web browser 440, a currently-executing screen is generated (step S1105).

Reference numerals 1201 and 1202 in FIG. 9 indicate examples of HTML data of the currently-executing screen that is generated in step S1105. "<meta http-equiv="refresh" content="0">" is embedded in the head tag of the HTML 1201 as a meta tag 1203. This is a tag that gives an instruction to reread a currently displayed page zero seconds later. The Web browser 440 displays the HTML 1201 and at the same time interprets the meta tag, and immediately transmits a request for screen update to the Web application 410. An area 1204 is the same as the area 904.

"onload="location.reload( )"" is embedded in a body tag 1205 of the HTML 1202. This is a JavaScript that is executed when the HTML is read, and is a process for rereading the currently displayed page. An area 1206 is the same as the area 904. The HTML 1201 and the HTML 1202 employ mutually different approaches, but realize the same processing.

As described above, according to the present embodiment, it is possible to immediately display the processing result to the user, in addition to achieving the effects of the first embodiment.

Third Embodiment

In the above-described second embodiment, the Web application 410 performs the process of deferring a response to a request from the Web browser 440. However, the present embodiment is different from the second embodiment in that the service provider 450 performs the deferring process. The communication between the Web application 410 and the service provider 450 can be reduced by the service provider 450 performing the deferring process. Furthermore, since it is no longer necessary to implement a deferring function in the Web application 410, the Web application 410 can be easily created.

In the present embodiment, in steps S517 and S522 (see FIG. 4) in which the Web application 410 requests the service provider 450 to obtain job status, the request includes a deferring time set as a parameter. The service provider 450 that has been required to obtain job status performs the same processing as in the second embodiment (see FIG. 8). The service provider 450 monitors the job status until either one of the following termination conditions is satisfied: a time period set in response to the request has elapsed, or the job has been completed, and returns a response to the Web application 410 if the termination condition is satisfied.

As described above, according to the present embodiment, it is possible to reduce the communication for obtaining the job status between the Web application 410 and the service provider 450, in addition to achieving the effects of the second embodiment.

Fourth Embodiment

In the above-described first embodiment, the Web application 410 transmits a request to the service provider 450. However, the present embodiment is different from the first embodiment in that a script that instructs the service provider 450 to execute specific processing is embedded in a response to the Web browser 440, thereby causing the service provider 450 to execute the processing.

The present embodiment is configured so as to be realizable even in such a restricted communication environment where the settings of a firewall prevent a connection from being made from the Web application 410 outside the firewall even when the service provider 450 opens a standby port on the MFP side.

It should be noted that in the present embodiment, since the Web browser 440 directly executes processing of the MFP 101, a timeout of the Web browser 440 does not occur. However, even with this configuration, the Web browser 440 and the Web application 410 are required to regularly communicate with each other.

The reason for this is that the Web application 410 generally associates requests from the same Web browser within a predetermined period of time with each other as a series of processing steps. As a result of associating the requests with each other in this manner, sequential processing by recording job IDs or log-in processing for each request can be omitted. If there is no request from the Web browser 440 to the Web application 410 for a predetermined period of time, these associations are lost, so that processing cannot be continued anymore.

Software Configuration of Information Processing System (FIG. 10)

A basic configuration is the same as that in FIG. 3, and therefore, only differences from FIG. 3 will be described. First, in the first embodiment, the logic unit 412 of the Web application 410 executes a job by directly communicating with the communication unit 451 of the service provider 450, whereas in the present embodiment, the logic unit 412 performs a process for generating a function execution script that executes a job. The generated function execution script is returned from the Web application 410 to the Web browser 440 as a response. Next, a script execution unit 1301 is added to the Web browser 440. The script execution unit 1301 interprets the function execution script received from the Web application 410 and gives job execution instruction to the service provider 450.

Processing Procedure of Information Processing System (FIG. 11)

Steps S1401 to S1407 are the same as processing of steps S501 to S507 (see FIG. 4) of the first embodiment. The Web application 410 that has received the request for function execution in step S1407 generates a function execution script corresponding to the request and returns the generated function execution script to the Web browser 440 as a response (step S1408).

Here, an example of the function execution script generated by the Web application 410 will be described using a script 1501 in FIG. 12. <ScanToFtp response-"0"> indicates that an FTP transmission job is to be executed in the immediate response mode. In the <Location> tag, it is set so that after execution of the job, a request is transmitted to the page of the <GetURL> tag using JobId as a parameter. The <Settings> tag and subsequent tags are settings for executing the function and are the same as the parameters 801.

The Web browser 440 analyzes the received function execution script and issues a function execution request to the service provider 450 (step S1409). Steps S1410 to S1414 are the same as the processing of steps S508 to S512 of the first embodiment.

The script execution unit 1301 that has received the function execution response in step S1413 responds to the Web browser 440 (step S1415). Furthermore, the Web browser 440 makes a request to the Web application 410 for screen update according to the settings in the <Location> tag of the script 1501 in FIG. 12 (step S1416).

The Web application 410 that has received the request for screen update records the job ID (step S1417). Furthermore, the Web application 410 returns a response to the Web browser 440 (step S1418).

According to the above-described processing, a series of processing steps from the transmission of the last response to the Web browser 440 by the Web application 410 in step S1408 until the receipt of the next request in step S1416 is immediately executed. Accordingly, the Web application 410 can have a request without waiting for completion of the execution of a job, and thus, a timeout can be prevented.

However, the foregoing processing alone does not make it possible to display a job processing result on the Web browser 440 and thereby present the result to the user. The processing described hereinbelow is related to a process for displaying the job processing result on the Web browser 440.

First, an example of a function execution script that is transmitted to the Web browser in step S1418 will be described using a script 1601 in FIG. 12. <GetJobStatus response="20"> indicates that job status is to be obtained after waiting for a deferring time of twenty seconds. In the <Location> tag, it is set so that after completion of the job, a request is transmitted to the page of the <GetURL> tag using JobStatus as a parameter. The <Settings> tag and subsequent tags are settings for executing the function, and JobID of the job whose status is to be obtained is specified.

In step S1418, the function execution script 1601 shown in FIG. 12 is returned to the Web browser 440 as a response. The Web browser 440 analyzes the received function execution script and requests the service provider 450 to obtain job status (step S1419). The script execution unit 1301 that has been requested to obtain job status obtains the job status from the service provider 450 (steps S1420 and S1421). The script execution unit 1301 repeatedly obtains the job status for the duration of the deferring time of twenty seconds set in the script 1601 in FIG. 12 or until the job is completed, and returns a response to the Web browser 440 (step S1422). It should be noted that this processing is the same as the deferring process that is performed in the second and third embodiments. The Web browser 440 that has received the job status in step S1422 transmits a request for screen update to the Web application 410 according to the settings in the <Location> tag of the script 1601 in FIG. 12. The Web application 410 performs, in steps S1424 to S1429, the same processing as in steps S1418 to S1423 unless the job status included in the request is "terminated". If the job status is "terminated", the Web application 410 returns HTML data of a termination screen to the Web browser 440 as a response (step S1430). The Web browser 440 displays the received termination screen (step S1431) and ends the series of processing steps.

As described in steps S1418 to S1431, while the MFP 101 is executing a job, the Web browser 440 can obtain the latest job status by regularly requesting screen update from the Web application 410. Thus, the termination screen can be presented to the user at a stage when the job status has changed to "terminated".

As described above, according to the present embodiment, the occurrence of a timeout process can be avoided as in the other first to third embodiments, and the discontinuance of a user operation due to a timeout can be avoided.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-291405, filed Dec. 22, 2009 which is hereby incorporated by reference herein in its entirety.

The invention claimed is:

1. An image processing system comprising:
a Web server; and
an image processing apparatus that displays a screen provided by said Web server,
said image processing apparatus comprising:
a first requestor that makes a request to said Web server to execute a function in accordance with an instruction entered by a user via the screen to execute the function;
a first receiver that receives the request to execute the function from said Web server, said Web server having received the request from said first requestor;
an execution unit that executes the function based on the request received by said first receiver;
a second receiver that receives a screen that indicates an execution status of the function;
a second requestor that makes a request to said Web server for a screen that indicates an updated execution status of the function; and
a third receiver that receives the screen that indicates the updated execution status of the function from said Web server, said Web server having received the request from said second requestor,
wherein at least a processor and memory are coupled to cooperate to function as at least one of said first requestor, said first receiver, said execution unit, said second receiver, said second requestor, and said third receiver; and
said Web server comprising:
a first transmitter that transmits the request to execute the function to said image processing apparatus in accordance with the request made by said first requestor;
a second transmitter that transmits the screen that indicates the execution status of the function to said image processing apparatus;
an obtainer that obtains the execution status of the function from said image processing apparatus; and a third transmitter that transmits the screen that indicates the updated execution status of the function to said image processing apparatus in accordance with the request from said second requestor, the screen transmitted by said third transmitter having been generated based on the execution status obtained by said obtainer, wherein at least a processor and memory are coupled to cooperate to function as at least one of said first transmitter, said second transmitter, and said third transmitter, and wherein the screen transmitted by said second transmitter defines a timing at which said second requestor makes the request, and said second requestor makes the request in accordance with the defined timing.

2. The image processing system according to claim 1, wherein the request by said first requestor, reception by said second receiver, the request by said second requestor, and reception by said third receiver are carried out using a Web browser.

3. The image processing system according to claim 2, wherein reception by said first receiver is carried out without using the Web browser.

4. The image processing system according to claim 1, wherein reception by said first receiver is carried out using a service provider.

5. The image processing system according to claim 1, wherein said obtainer obtains the execution status of the function in accordance with the request by said second requestor.

6. The image processing system according to claim 1, wherein the defined timing is a point in time at which a predetermined amount of time has elapsed after said second receiver receives the screen.

7. The image processing system according to claim 1, wherein the function is a function of transmitting image data generated by reading an image on an original.

8. The image processing system according to claim 1, wherein the execution status includes at least one of a status of the function as being normally terminated, terminated by cancellation, and currently executing.

9. A Web server that communicates with an image processing apparatus having a first requestor that makes a request to execute a function in accordance with an instruction by a user to execute the function, a first receiver that receives a request to execute the function in accordance with the request from the first requestor, an execution unit that executes the function based on the request received by the first receiver, a second receiver that receives a screen that indicates an execution status of the function, a second requestor that makes a request to the Web server for a screen that indicates an updated execution status of the function, and a third receiver that receives the screen that indicates the updated execution status of the function according to the request from the second requestor, said Web server comprising:

a first transmitter that transmits the request to execute the function to the image processing apparatus in accordance with the request by the first requestor;

a second transmitter that transmits the screen that indicates the execution status of the function to the image processing apparatus;

an obtainer that obtains the execution status of the function from said image processing apparatus; and a third transmitter that transmits the screen that indicates the updated execution status of the function to the image processing apparatus in accordance with the request from the second requestor, the screen transmitted by said third transmitter having been generated based on the execution status obtained by said obtainer, wherein at least a processor and memory are coupled to cooperate to function as at least one of said first transmitter, said second transmitter, and said third transmitter, and wherein the screen transmitted by said second transmitter defines a timing at which the second requestor makes the request.

10. The Web server according to claim 9, wherein said obtainer obtains the execution status of the function in accordance with the request by the second requestor.

11. The Web server according to claim 9, wherein the defined timing is a point in time at which a predetermined amount of time has elapsed after the second receiver receives the screen.

12. The Web server according to claim 9, wherein the function is a function of transmitting image data generated by reading an image on an original.

13. The Web server according to claim 9, wherein the execution status includes at least one of a status for when the function was normally terminated, a status for when the function was terminated by cancellation, and a status for when the function is currently executing.

14. A method of image processing in an image processing system having a Web server and an image processing apparatus that displays a screen provided by the Web server, the method comprising:

in the image processing apparatus:
a first requesting step of making a request to the Web server to execute a function in accordance with an instruction by a user via the screen to execute the function;
a first receiving step of receiving a request to execute the function from the Web server, the Web server having received the request in said first requesting step;
an execution step of executing the function based on the request received in said first receiving step;
a second receiving step of receiving a screen that indicates an execution status of the function;
a second requesting step of making a request to the Web server for a screen that indicates an updated execution status of the function; and
a third receiving step of receiving the screen that indicates the updated execution status of the function from the Web server, the Web server having received the request in said second requesting step, and in the Web server:
a first transmission step of transmitting the request to execute the function to the image processing apparatus in accordance with the request in said first requesting step;
a second transmission step of transmitting the screen that indicates the execution status of the function to the image processing apparatus;
an obtaining step of obtaining the execution status of the function from said image processing apparatus; and
a third transmission step of transmitting the screen that indicates the updated execution status of the function to the image processing apparatus in accordance with the request in said second requesting step, the screen transmitted in said third transmitting step having been generated based on the execution status obtained in said obtaining step,
wherein the screen transmitted in said second transmission step defines a timing at which said request is made in said second requesting step, and the request in said second requesting step is made in accordance with the defined timing.

15. A non-transitory computer readable storage medium storing a program that when executed causes a computer to perform the method according to claim 14.

16. A method of controlling a Web server that communicates with an image processing apparatus, having a first requestor that makes a request to execute a function in accordance with an instruction by a user to execute the function, a first receiver that receives a request to execute the function in accordance with the request from the first requestor, an execution unit that executes the function based on the request received by the first receiver, a second receiver that receives a screen indicating an execution status of the function, a second requestor that makes a request for a screen that indicates an updated execution status of the function, and a third receiver that receives the screen that indicates the updated execution status of the function according to the request from the second requestor, the method comprising:

a first transmission step of transmitting the request to execute the function to the image processing apparatus in accordance with the request by the first requestor;

a second transmission step of transmitting the screen that indicates the execution status of the function to the image processing apparatus;

an obtaining step of obtaining the execution status of the function from said image processing apparatus; and a third transmission step of transmitting the screen that indicates the updated execution status of the function to the image processing apparatus in accordance with the request from the second requestor, the screen transmitted in said third transmitting step having been generated based on the execution status obtained in said obtaining step, wherein the screen transmitted in said second transmission step defines a timing at which the second requestor makes the request.

17. A non-transitory computer readable storage medium storing a program that when executed causes a computer to perform the method according to claim 16.

* * * * *